United States Patent
Schiller et al.

(10) Patent No.: US 6,577,299 B1
(45) Date of Patent: Jun. 10, 2003

(54) ELECTRONIC PORTABLE PEN APPARATUS AND METHOD

(75) Inventors: Illya Schiller, Brookline, MA (US); Arkady Pittel, Brookline, MA (US)

(73) Assignee: Digital Ink, Inc., Brookline, MA (US)

( * ) Notice: Subject to any disclaimer, the term of this patent is extended or adjusted under 35 U.S.C. 154(b) by 0 days.

(21) Appl. No.: 09/376,837

(22) Filed: Aug. 18, 1999

Related U.S. Application Data
(60) Provisional application No. 60/142,201, filed on Jul. 1, 1999, provisional application No. 60/142,200, filed on Jul. 1, 1999, and provisional application No. 60/096,988, filed on Aug. 18, 1998.

(51) Int. Cl.[7] ................................................ G09G 5/00
(52) U.S. Cl. ........................ 345/179; 345/158; 345/175; 345/177
(58) Field of Search .......................... 345/173–179, 345/158; 341/22; 178/18.01, 18.02, 18.03, 18.04, 18.05, 18.06, 18.07, 18.09, 18.1, 19.01–19.07

(56) References Cited

U.S. PATENT DOCUMENTS

| | | |
|---|---|---|
| 3,376,551 A | 4/1968 | Armbruster |
| 3,915,015 A | 10/1975 | Crane et al. .................. 73/432 |
| 4,124,838 A | 11/1978 | Kiss ............................... 340/1 |
| 4,131,880 A | 12/1978 | Siy et al. .................. 340/146.3 |
| 4,751,741 A | 6/1988 | Mochinga et al. ............ 382/13 |
| 4,806,707 A | 2/1989 | Landmeier |
| 4,883,926 A | 11/1989 | Baldwin |
| 4,891,474 A | 1/1990 | Kelly |
| 5,121,441 A | 6/1992 | Chefalas et al. .............. 382/13 |
| 5,215,397 A | 6/1993 | Taguchi et al. ............. 401/194 |
| 5,227,622 A | 7/1993 | Suzuki ....................... 250/221 |
| 5,247,137 A | 9/1993 | Epperson |
| 5,301,222 A | 4/1994 | Fujiwara ...................... 379/58 |
| 5,371,516 A | 12/1994 | Toyoda et al. .............. 345/179 |
| 5,434,371 A | 7/1995 | Brooks et al. |
| 5,453,762 A | 9/1995 | Ito et al. ..................... 345/179 |
| 5,517,579 A | 5/1996 | Baron et al. ................ 382/187 |
| 5,548,092 A | 8/1996 | Shriver |
| 5,587,558 A | 12/1996 | Matsushima |
| 5,652,412 A | 7/1997 | Lazzouni et al. |
| 5,818,424 A | 10/1998 | Korth ......................... 345/158 |
| 5,902,968 A | 5/1999 | Sato et al. ............... 178/19.01 |
| 6,191,778 B1 * | 2/2001 | Chery et al. ................ 345/173 |
| 6,326,956 B1 * | 12/2001 | Jaeger et al. ............... 355/179 |
| 6,344,848 B1 * | 2/2002 | Rowe et al. ................ 345/179 |
| 6,348,914 B1 * | 2/2002 | Tuli ............................ 345/179 |

FOREIGN PATENT DOCUMENTS

| | | |
|---|---|---|
| WO | WO94/09447 | 4/1994 |
| WO | WO94/18663 | 8/1994 |

* cited by examiner

*Primary Examiner*—Steven Saras
*Assistant Examiner*—Amr Awad
(74) *Attorney, Agent, or Firm*—Martin Novack

(57) ABSTRACT

A wireless pen apparatus for producing signals representative of writing by a user, including: a wireless pen; a removable cap on the pen; and, when the cap is removed from the pen and placed at a reference position, communicating wave energy between at least one location on the pen and at least one location on the cap for determining the position of the at least one location on the pen with respect to the reference position of the cap, and for producing signals that depend on the determined position of the at least one location on the pen.

22 Claims, 17 Drawing Sheets

ELECTRONIC PORTABLE PEN APPARATUS AND METHOD

RELATED APPLICATIONS

This application claims priority from U.S. Provisional Patent Application Serial No. 60/096,988, filed Aug. 18, 1998, and from U.S. Provisional Patent Application Serial No. 60/142,200, filed Jul. 1, 1999, and from U.S. Provisional Patent Application Serial No. 60/142,201, filed Jul. 1, 1999, and all of said U.S Provisional Patent Applications are incorporated herein by reference.

FIELD OF THE INVENTION

This invention relates to apparatus for writing and for producing signals representative of the writing, and, more particularly, to a wireless pen apparatus that can be used to write and to produce and store electronic signals for subsequent transfer to other equipment.

BACKGROUND OF THE INVENTION

Various writing devices for inputting information to equipment such as computers have been in widespread use for many years. For example, graphical data tablets that use a stylus for writing or pointing are common computer input devices, and operate on various physical principles, for example distance ranging using acoustic energy that travels through air, through a solid surface, or through magnetostrictive wires, or electromagnetic energy that travels through a conductive grid. These devices have conventionally had a wire connected to the stylus for providing power, timing, and other necessary functions, or required a digitizer tablet underneath the writing surface.

Attempts have been made to develop a wireless electronic pen that does not have to be tethered to other equipment. Reference can be made, for example, to U.S. Pat. Nos. 5,215,397, 5,227,622, and 5,247,137. However, no wireless electronic pen for obtaining electronic signals representative of writing has become commercially viable, for a number of reasons. Some approaches would require too much power at the pen, which would quickly run down the battery in the pen that provides power. Other approaches would require a pen that is too bulky. Still other approaches do not provide sufficient resolution and/or accuracy for reliable handwriting input.

It is among the objects of the present invention to provide an electronic portable wireless pen that overcomes disadvantages of prior approaches.

SUMMARY OF THE INVENTION

A form of the present invention is directed to a method for producing signals representative of writing by a user of a wireless pen, comprising the following steps: providing a first subsystem for determining absolute position of a location on the pen with respect to a geometrical reference spaced from the pen; operating the first subsystem at time intervals to obtain absolute position indications; providing a second subsystem that is operative to determine relative position excursions of the tip of the pen; and producing signals representative of said writing from the combination of the absolute position determinations and the relative position determinations. Among the advantages of this form of the invention is that the first subsystem operates at time intervals and uses less power than continuous absolute position determination would entail. In an embodiment of this first form of the invention, the step of providing the first subsystem comprises providing a first subsystem that implements distance ranging in either or both directions between said location on the pen and a plurality of locations on the geometrical reference. In this embodiment, the first subsystem implements distance ranging using ultrasonic energy in one of the directions between said location on the pen and the plurality of locations on the geometrical reference and implements infra-red signaling in the other of the directions between said location on the pen and the plurality of locations on the geometrical reference.

A further form of the invention is directed to a wireless pen apparatus for producing signals representative of writing by a user of the pen, which includes the following: a wireless pen; a removable cap on the pen; and means, operable when the cap is removed from the pen and placed at a reference position, for communicating wave energy between at least one location on the pen and at least one location on the cap for determining the position of the at least one location on the pen with respect to the reference position of the cap, and for producing signals that depend on the determined position of said at least one location on the pen. Thus, in this form of the invention, the pen and its cap achieve a self-contained wireless pen apparatus that can efficiently capture writing of the user and store same in electronic form for subsequent transfer to external equipment such as a computer or a personal digital assistant ("PDA"). In an embodiment of this form of the invention, the wave energy is optical radiation, the optical radiation is transmitted from said at least one location on the pen, and the cap has first and second optical sensor arrays at said first and second locations, respectively.

A still further form of the invention is directed to a method for producing and transferring signals representative of writing by a user of a wireless pen, comprising the following steps: providing a communications subsystem on the pen; providing a wristwatch that has a communications subsystem for communicating with the communications subsystem on the pen; and communicating signals from the pen to the wristwatch that are indicative of the position of the tip of the pen.

Further features and advantages of the invention will become more readily apparent from the following detailed description when taken in conjunction with the accompanying drawings.

DETAILED DESCRIPTION

Figure 1:
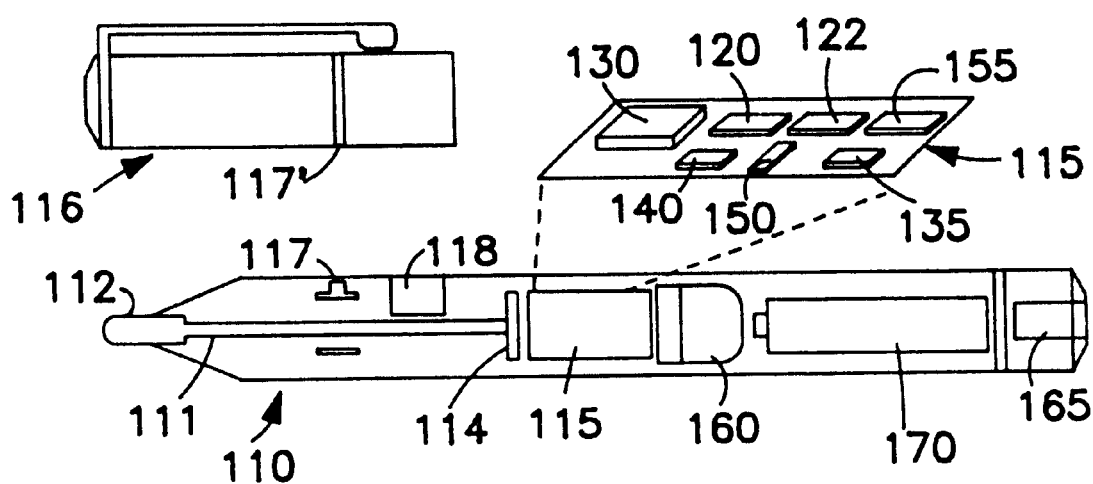
FIG. 1 is a diagram, partially in schematic form and partially in block form, of a wireless pen in accordance with an embodiment of the invention.
Figure 2:
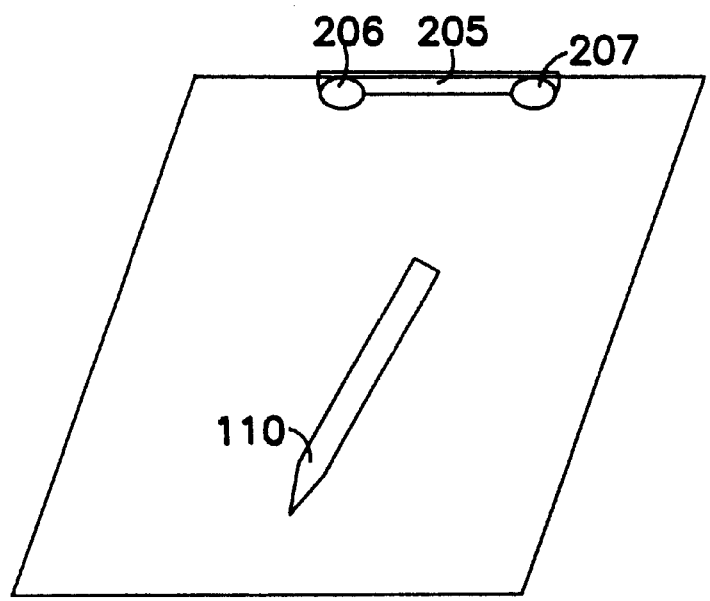
FIG. 2 is a diagram illustrating an embodiment of the wireless pen apparatus in accordance with an embodiment of the invention, and showing a wireless pen and an associated reference medium in the form of a clip that is attached to the edge of a writing paper to define a geometrical reference for a writing session.

Referring to FIG. 1, there is shown a wireless pen 110 in accordance with a first embodiment of the invention. In a form of this first embodiment, the pen 110 is part of a wireless pen apparatus that includes a medium spaced apart from the pen which defines the geometrical reference with respect to which the position of the pen (i.e., a location thereon) is determined. FIG. 2 shows the medium in the form of a clip 205 which can be attached to the edge of a paper or pad (reference numeral 202). As described further hereinbelow, and in accordance with a feature hereof, the medium can comprise the pen cap, or an expanded version thereof. In the FIG. 1 embodiment, the pen has a writing tip 112 which can be for example, the tip of a replaceable ball point cartridge 111. A pressure switch 114 is mounted behind the cartridge 111 and produces an electronic signal when there is pressure from writing. Behind the pressure switch is a circuit module 115, components of which are represented in block form next to the pen in FIG. 1. The module 120 includes a microprocessor subsystem 120 which includes, inter alia, flash memory 122. In the present embodiment, the module 115 also includes micro-accelerometers 130, gyros 135, ultrasonic ranging circuitry 140, signal conditioning circuitry 150, and serial communications circuitry 155. An ultrasonic transducer 118 is coupled with the ultrasonic ranging circuitry and, in a form of the present embodiment, is used for transmitting and receiving ultrasonic signals. The pen 110 also contains a tilt sensor 160 and has a serial port 165 at the back end thereof, the serial port being coupleable to a suitable receptacle in any other external equipment (e.g. a computer, PDA, or any of the other related equipment described herein). The pen 110 also has a battery compartment for housing a battery 170. The pen cap 116 is provided with a ring 117' that closes an on/off 117 switch when the cap is on the pen.

In operation, the pen's inertial navigation subsystem, including the described micro-accelerometers and gyros, capture the pen's relative movement and determine the pen's tip movements. Since accelerometer errors will accumulate, the pen's absolute position measurement subsystem is operated at intervals to reset the position determination and utilizes a beacon technology which, in the present embodiment is ultrasonic ranging. The described form of this embodiment utilizes a passive reference medium (clip 205 of FIG. 2) that has two spaced apart acoustic reflectors 206 and 207 having different reflective characteristics.

Electronic pen with inertial navigation must deal with gravitational component of acceleration measurements. Accelerometers cannot distinguish gravitational acceleration from pen movement acceleration. Ability to remove gravity from accelerometer outputs requires the knowledge of orientation of the pen. Gyroscopes or tilt sensors are used for that purpose. In addition, the accelerometer errors grow with time square overwhelm any ability to sense pen movement. Even for the most accurate accelerometer sensors, only minutes or seconds of writing are enough for accelerometer drift to grow thousand times larger then the normal writing surfaces making it impossible to restore handwriting. Beacon technology is necessary to reset accelerometer errors periodically.

Tilt or gyroscope sensor may be used to measure pen angles to writing surface to cancel gravitational components of acceleration. Tilt sensor can be electrolytic or based on accelerometer or gyroscopic technology.

As described further hereinbelow, external navigation to obtain absolute position with respect to a reference medium is realized using ultrasound technology, infrared or radio frequency beacons. In its simplest implementation, a single transmitter/receiver ultrasound can be positioned at the tip of pen pointing to the top or side of paper where reflectors are attached using clip 205 (FIG. 2). Pulsed ultrasound technology can be used. The pen will measure the distance to beacon in writing surface reference frame. Two distances are needed to determine the pen location on paper in horizontal (x) and vertical (y) coordinates.

To resolve ambiguity of pen movement, reflectors 206, 207 should be of different reflective strength. If reflectors have similar reflective property the receiver on-pen will never resolve if reflection came from one or the other reflector thus introducing the symmetrical ambiguity (see FIG. 3). In the present embodiment where the reflectors are different, the signals returned to the pen receiver are analyzed for two characteristics: time of flight (TOF) and reflected energy. TOF indicates the distance and reflective energy indicates which reflector returns which signal. Reflective energy is computed by multiplying reflector signal by gain slope as function of TOF.

In the present embodiment with all electronics on pen, information from all sensors shall be collected by the on-pen microprocessor subsystem and stored in non-volatile memory. Measurements from accelerometers and gyroscope or tilt sensors can be taken with a sampling frequency allowing for adequate resolution of tip movements, approximately 100 to 300 Hz. Sampling frequency is preferably constant that allows a permanent interval of integration later on the host computer.

When connected to a serial port or USB port, collected data can be downloaded to a host computer device. Another communication method especially effective with PDAs, cameras, or cell phones, is an infrared link already available on some PDAs such as PalmPilot, can be implemented.

The host computer or PDA can perform reconstruction of pen traces on writing surface. Translation of cursive writing to ASCII characters can be implemented using a well known handwriting recognition software package.

Figure 4:
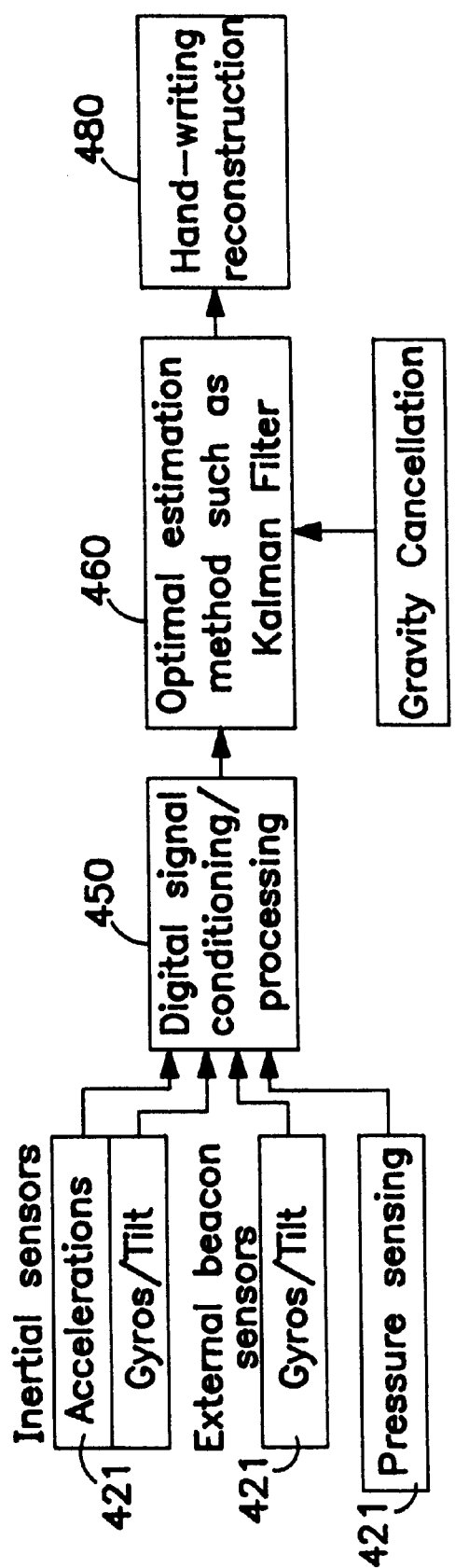
FIG. 4 is a diagram illustrating handwriting reconstruction flow from sensor inputs.

The pen trace reconstruction can be implemented as shown in the FIG. 4. Digital filtering is applied to all measurements to reject always present offsets and high frequency noise outside of pen tip movement bandwidth. After filtering, measurement data is integrated within a Kalman filter for optimal estimation of pen tip position in a statistical sense. In Kalman smoothing, forward (all previous measurements) and backward (all subsequent measurements) filtering is applied when all data is available.

The orientation of the pen is used to estimate and cancel gravity component in measured accelerations.

Figure 5:
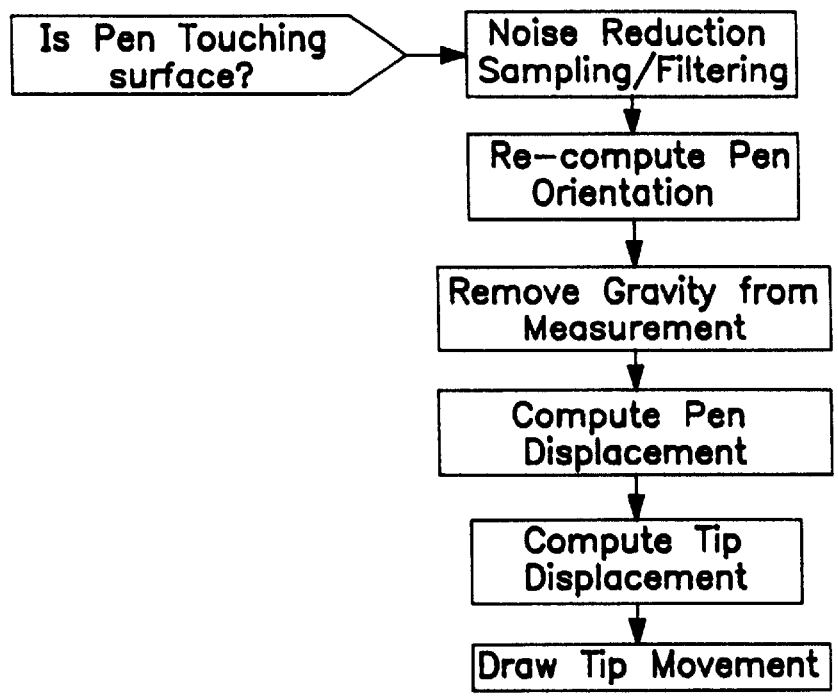
FIG. 5 is a flow diagram useful in understanding the determination of tip movement.

In addition to filtering, several computational steps are needed to convert sensor measurements into the pen tip displacement. The top-level software diagram is shown in FIG. 5. The process includes: 1. determine orientation of pen in writing surface coordinate system, 2. remove gravity from measurements, 3. compute pen displacement, and 4. compute pen tip displacement. Note that some of these steps (like removing of gravity) may be performed in the Kalman filter block in FIG. 4.

Conversion of measurements into movement of the tip of the pen can be understood as follows. As an example, if electronic pen inertial sensors include 2 accelerometers, a tilt sensor and a pressure sensor. The output of wireless pen apparatus at the t is:

$$M_t=(a_x+g_x, a_y+g_y, \phi, \gamma, p) \qquad (1)$$

where $(a_x+g_x, a_y+g_y,)$—orthogonal acceleration measurements with gravity present, both perpendicular to the shaft of pen. $\phi$—angle of pen with horizontal writing surface; $\theta$—angle between horizontal line perpendicular to pen shaft and x-axes of accelerometer; p—the pressure sensor indicating the pen is marking the surface, (p=0 no marking, p=1 pen is marking), FIG. 6. The pen coordinate system (x, y, z) with x-axis is along x-accelerometer, y-axes is along y-accelerometer, and z-axis is along the shaft of pen with positive direction up.

Figure 7A:
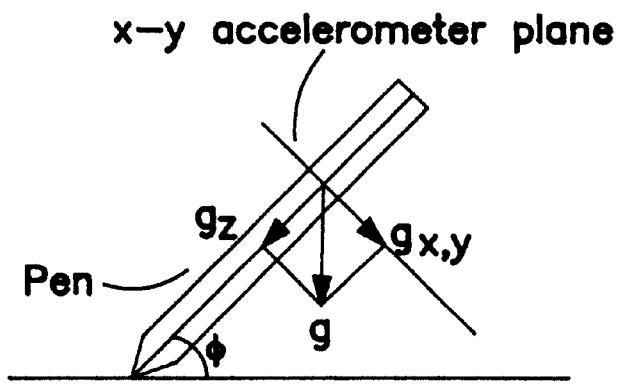
Figure 7B:
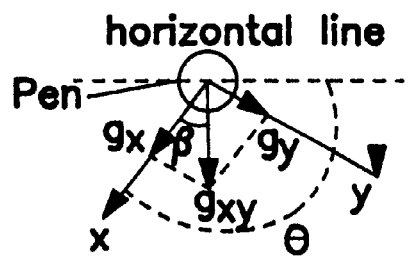

A first step is to remove gravity components from the measurements (see FIGS. 7A and 7B). The gravity components along the shaft of pen and x-y plane are:

$$g_z=-g*Cos(90-\theta)$$

$$g_{x,y}=g*Sin(90-\theta) \qquad (2)$$

and the gravity vector component in x-y plane can be computed (see FIG. 7B) as:

$$g_x=g_{xy}*Cos\beta$$

$$g_y=g_{xy}*Sin\beta \qquad (3)$$

where $\beta$ is the angle between $g_{xy}$ and x axis, $\beta=\theta-90$ degrees. Now that gravity components have been computed $(a_x, a_y)$ accelerations from pen movement can be determined.

Figure 6:
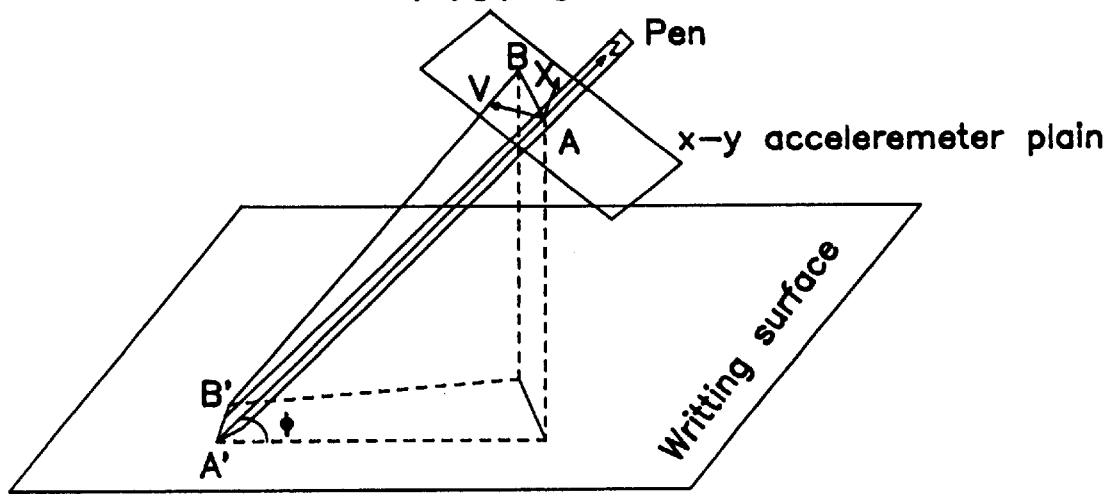
FIGS. 6, 7A, 7B, and 8 are diagrams that are useful in understanding position determinations used in embodiments hereof.

Pen displacement is next treated. First, assume that the flat writing surface coordinate system origin is where the tip of the pen touches the surface first and x axis is along pen's projection on the surface (FIG. 6). When the pen's accelerometers and a pressure sensor detects the movement on surface and gravity is cancelled, the pen acceleration is now known: $(a_x, a_y)$. Pen velocity and displacement are computed with classical kinematic equations in pen coordinate system:

$$V_x=a_x t, \text{ and } x=V_{x\text{-last}}t+\tfrac{1}{2}a_x t^2$$

$$V_y=a_y t, \text{ and } y=V_{y\text{-last}}t+\tfrac{1}{2}a_y t^2 \qquad (4)$$

where $(V_{x\text{-last}}, V_{y\text{-last}})$ are the initial pen velocity computed from the previous step. When pen starts from rest $(V_{x\text{-last}}, V_{y\text{-last}})$ are zeros.

Next, it is necessary to translate pen-detected movement at accelerometers to movement of the pen tip. First, transformation of pen movement is applied to a coordinate system which coincides with $g_{xy}$ vector and the horizontal line in FIG. 7B using a coordinate transformation formula:

$$x'=x\cos\beta+y\sin\beta$$

$$y'=x\cos\beta+x\sin\beta \qquad (5)$$

Now it is possible to find the displacement of pen on writing surface:

$$\Delta x=x'\cos\phi$$

$$\Delta y=y' \qquad (6)$$

Figure 8:
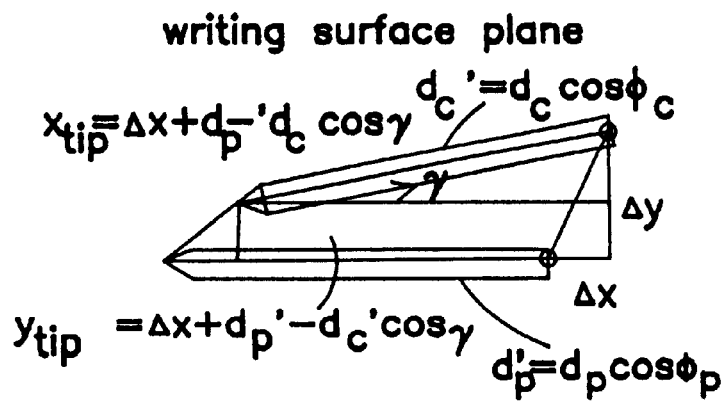

The y axis is parallel to the surface so the displacement projection did not change. If the pen does not change its orientation then its tip displacement is the same as the pen's, (see FIG. 8). If the pen changes its orientation, detected by the sensor as angle $\gamma$, then tip displacement is:

$$\Delta x_{tip}=\Delta x+d_p'-d_c'\cos\gamma$$

$$\Delta y_{tip}=\Delta y+d_c'\cos\gamma \qquad (7)$$

where $d_c'=d \cos \phi$ is a current projection of a length of the pen to the surface from pen's coordinate origin to its tip, and $d_p'=d \cos \phi_p$ is the same projection at the previous measurement.

Note that conversion from measurements to tip displacement is only needed if the pen is actually marking the surface. Otherwise the accelerometer outputs are summed up until the pen starts writing. In this example there are some unobservable states of pen movement. By measuring a third acceleration component $a_z$, and additional gyro angles, the pen state will have all observable displacements.

After this process, handwriting is available for handwriting recognition. There are several commercially available packages that can be used for this process. Handwriting recognition software algorithms may be improved by the fact that direction of pen tip movement on paper is available, unlike regular handwriting recognition packages when only the image of written marks is available.

Figure 9:
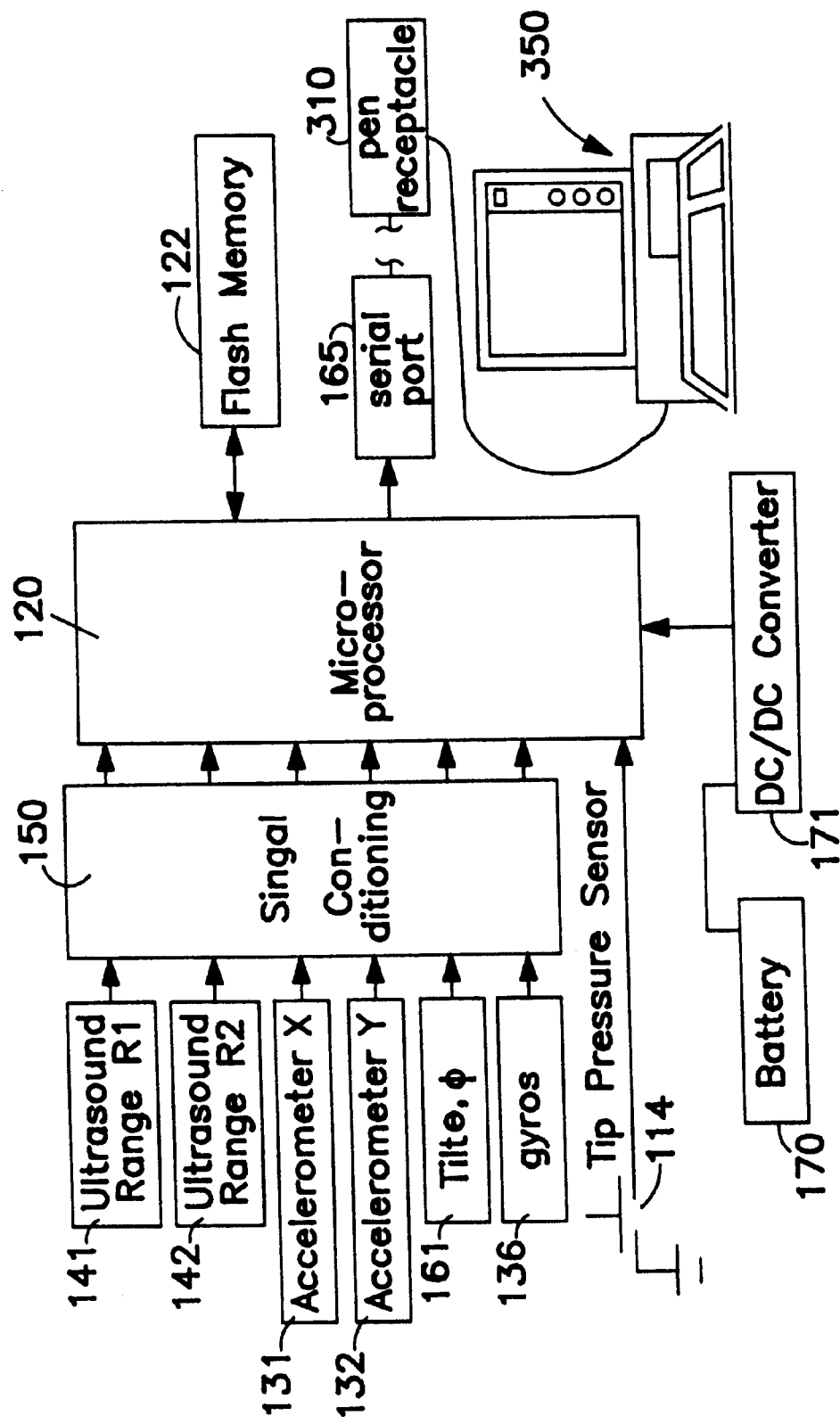
FIG. 9 is a block diagram of wireless pen circuitry and related equipment in accordance with an embodiment hereof.

FIG. 9 is a block diagram of components of the pen, and includes the microprocessor subsystem 120 and the signal conditioning circuitry 150. The microprocessor subsystem 120 will conventionally include associated timing, memory, and input/output functions (not separately shown), as well as the flash memory 122. The signal from the tip pressure switch 114 is coupled to the microprocessor subsystem. Also coupled to the microprocessor subsystem, via signal conditioning circuitry 150, are signals from the ultrasonic ranging circuitry representing ranges designated R1 and R2, as represented by blocks 141 and 142, respectively, and the orthogonal accelerometer signals as represented by the blocks 131 and 132, respectively, and also the tilt and azimuth signals (block 161 and gyro signals (block 136). The battery 170 is coupled to DC/DC converter 171, whose output is, in turn coupled at the appropriate voltage to microprocessor 120 and to the other circuits requiring power. Microprocessor outputs are coupled via the serial port 165 to an external pen receptacle 310, the output of which can be coupled to a host computer (represented at 350, or to a personal digital assistant (PDA), or any suitable external equipment. It will be understood that the position-representative information (or handwriting-representative information (if recognition software is also provided at the pen—optional) could also be input to the external equipment via wireless means such as conventional infra-red communication.

Figure 3:
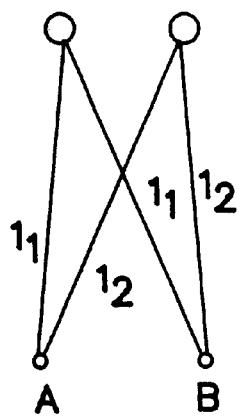
FIG. 3 is a diagram useful in understanding an ambiguity that is solved by an embodiment of the invention.
Figure 10A:
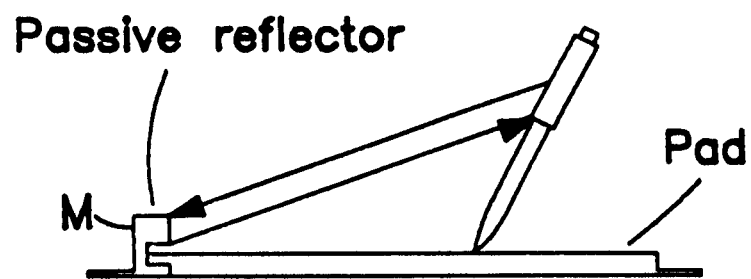
FIGS. 10A, 10B, 10C, and 10D illustrate alternative approaches for embodiments of the invention.
Figure 10B:
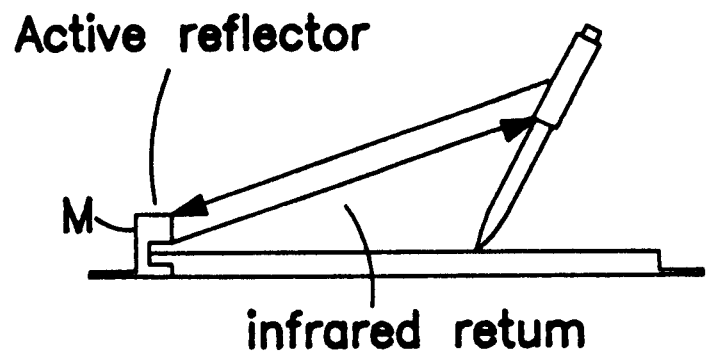
Figure 10C:
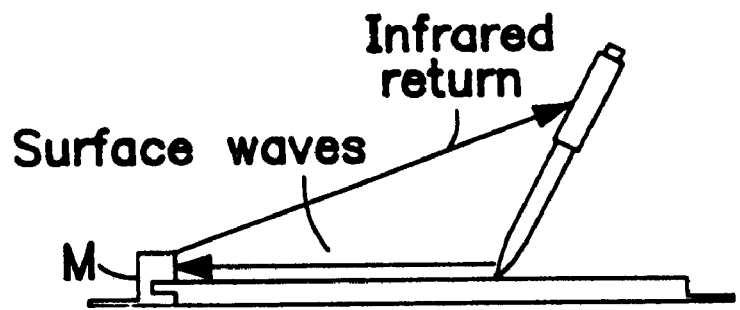
Figure 10D:
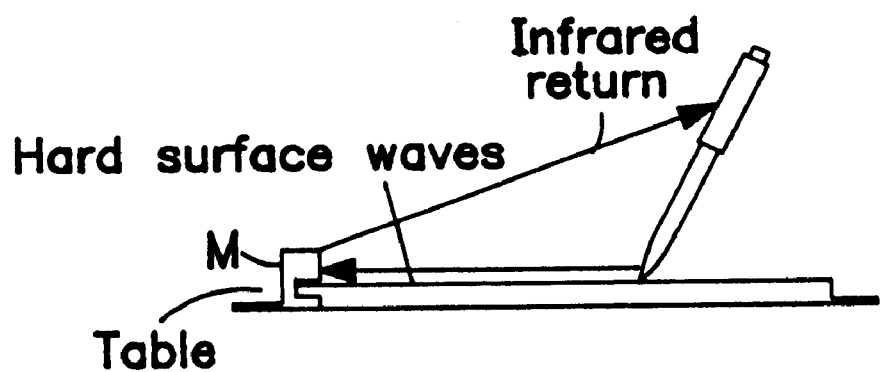

FIG. 10A shows a simplified diagram of the operation of the form of the first embodiment as was described in conjunction with FIGS. 1–3; that is, with a reflective medium having two passive reflectors. FIGS. 10B, 10C and 10D illustrate alternative embodiments that utilize one-way acoustic (preferably ultrasonic) time-of-flight determination to the reference medium (generally, M, in the simplified diagrams), with a return infrared signal providing instantaneous signalling back to the pen that the ultrasound signal has been received. Again, the ultrasonic signal will preferably be received at two spaced-apart locations on the reference medium so that the position of the pen (that is, the transducer location thereof) can be unambiguously determined. In the diagram of FIG. 10B, the ultrasound is a through-the-air signal, whereas the diagram of FIG. 10C represents the case of surface wave ultrasound that travels on the writing surface, and the diagram of FIG. 10D represents the case of ultrasound travelling through a hard surface, such as a table beneath a writing surface.

In the reflective approach of FIG. 10A (or any other suitable embodiments), a variation would be to use two receiving transducers on the pen. This would permit an alternate technique of finding the tilt angle of the pen. In the approach of FIG. 10A, two reflectors of different reflectivity can be used, as previously noted, to obtain reflected signals of different strengths. As described above, on-pen electronics can amplify signal with gain as a function of time delay to compensate for different times of flight and to compare the two reflected signals to resolve lateral positioning. This approach will preferably use a noise reduction technique in software to remove erroneous signal pick-ups and echoes from alien objects, and small amplitude of received signal. In the approaches of FIGS. 10B, 10C, and 10D, the on-pen transducer is only a transmitter. This transducer sends two omnidirectional ultrasound bursts at two different carrier frequencies that are picked up by two separate ultrasound receivers, each tuned to one of two transducer frequency. The response signal is sent back to the pen by infrared light. On-pen electronics records time-of-flight from two distinctive active transponders.

Figure 11:
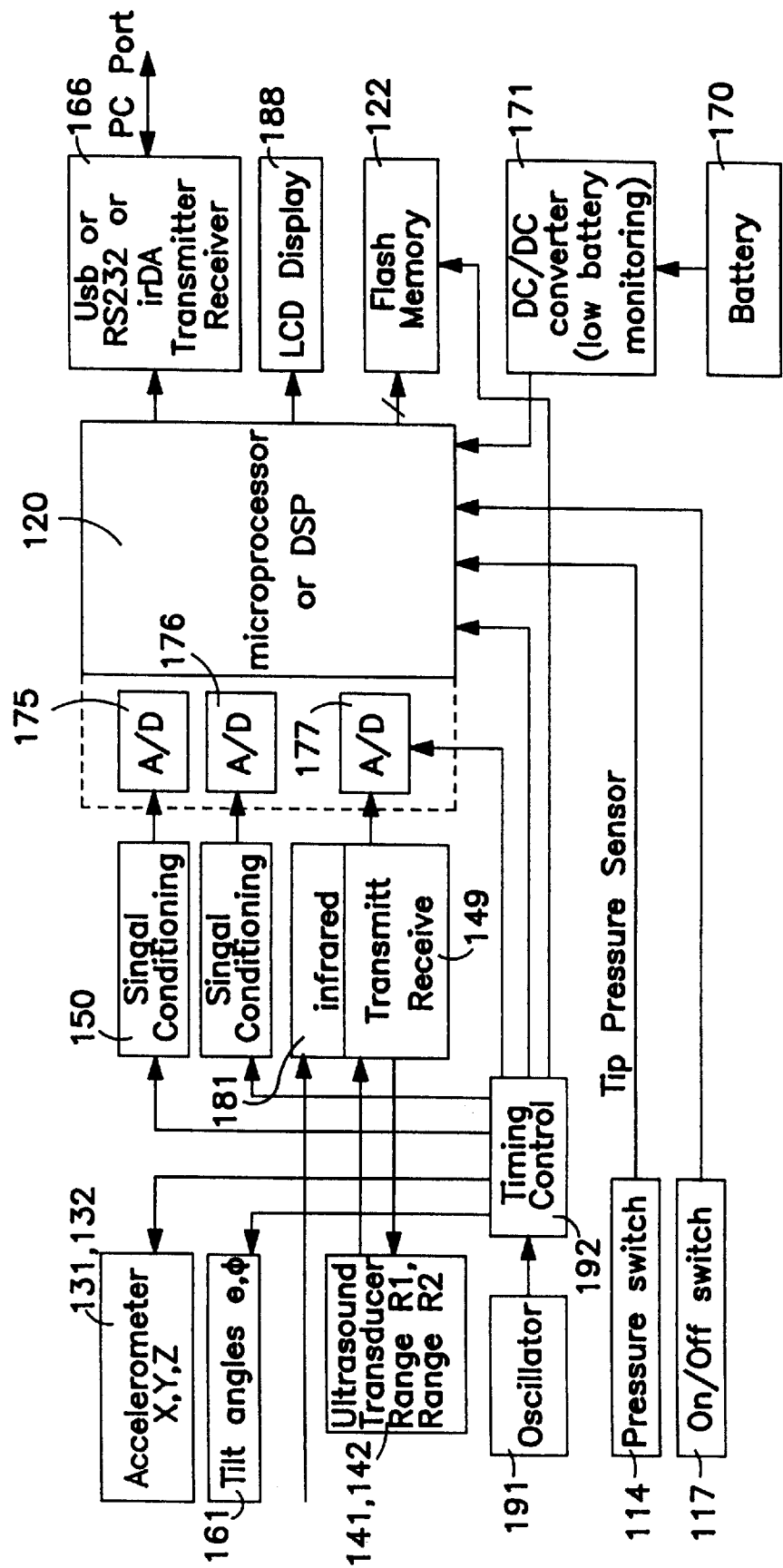
FIG. 11 is a block diagram of circuitry for use in the further embodiments invention.

FIG. 11 is a block diagram of the pen electronics for the embodiments of FIGS. 10B, 10C or 10D that utilize one way ultrasonic transmission with infra-red signalling back. In the block diagram of FIG. 11, elements 114 (pressure switch), 120 (microprocessor subsystem), 122 (flash memory), 131, 132 (accelerometers), 141, 142 (ultrasonic ranging), 150 (signal conditioning), 161 (tilt angle determination), 170 (battery), and 171 (DC/DC converter—also with low battery monitor) correspond generally to their counterparts in FIG. 9. Also, the FIG. 11 diagram includes the infrared sensor input 181, and shows oscillator circuit 191 as providing input to timing control circuit (192), which in turn provides inputs to the various circuits, including the transmit/receive circuitry 149 which, in this case, is shown separately. Also shown in FIG. 11 is on/off switch 117, individual analog-to-digital converters (175, 176, 177), LCD display (188), and communications circuit (166) which, in this case, includes USB, or RS232, or IrDA capability.

There are three basic power modes of operation for the illustrated embodiments: normal mode, idle (or standby) mode and sleep mode. The pen is in sleep mode when the pen cover is taken off, and the "on/off" switch is in "on" position, but the pen is not making traces on paper. Therefore, the pressure switch is not yet activated. With activation of the pressure switch the pen goes into the mode when it toggles between two modes of operation: normal or data acquisition mode and idle or standby mode. Standby mode has importance in keeping power consumption at a minimum when writing, and is possible because sampling rate can be around 100 Hz. The idle mode is followed by normal operation with signal acquisition, data preprocessing and storage into memory, and then idle mode again. Toggle between normal and idle modes are realized by a timing control circuitry that generate timing control signals for the pen electronics and timing interrupts for the on-pen processor. Initiation of wake up cycle for electronics, particularly sensors and transducers, will allow for enough settling time, before a particular function block can be fully functional for normal operation and signal acquisition. Most of the time the pen processor goes into idle mode right after the acquired data is preprocessed and stored in its internal RAM. However, when the RAM becomes full or/and the size of flash memory page is reached, the processor will write data from RAM to flash memory, and then go into the idle mode.

Figure 12:
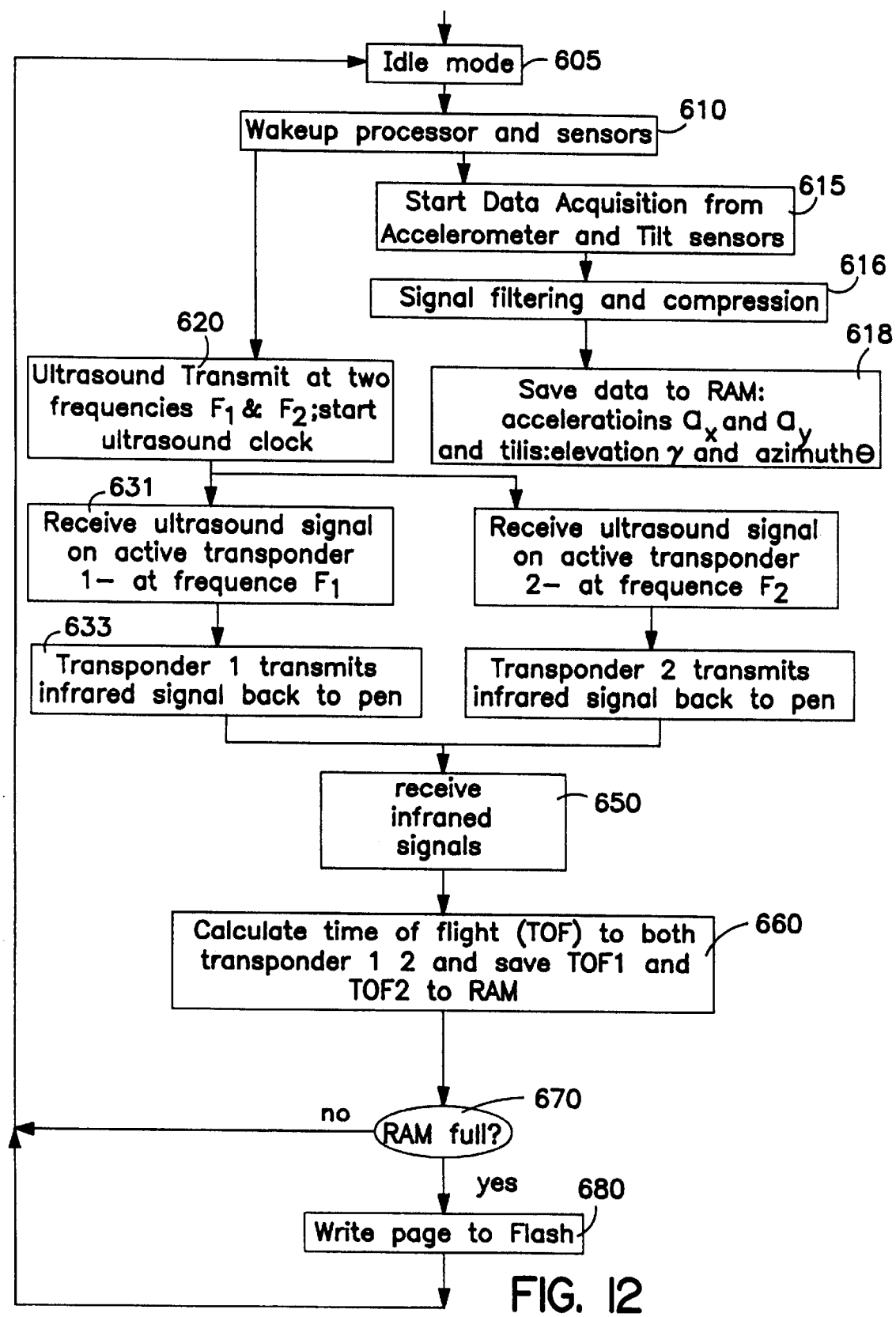
FIG. 12 is a flow diagram of a routine for controlling a processor as utilized in a form of the invention.

Referring to FIG. 12, there is shown a flow diagram of a routine that can be used for controlling the microprocessor subsystem of the FIG. 11 embodiment to implement the sensor activation and data collection for a sample cycle of operation. The block 605 represents the idle mode status, and the block 610 represents the wake-up of the processor and sensors, responsive to time interrupt controlled by timing control circuitry of FIG. 11. This initiates, in the right-hand branch, the start of data acquisition from the accelerometer and tilt sensors (block 615), the signal filtering and compression (block 616), and the saving of the data to random access memory (block 618); namely, accelerations designated $a_x$ and $a_y$, and tilts, that is, elevation $\phi$ and azimuth $\theta$. In the lefthand branch, the block 620 represents transmitting of ultrasound at the two frequencies, $F_1$ and $F_2$, and the starting of the ultrasound clock or counter. Then, the blocks 631 and 641 respectively represent the awaiting of received ultrasound signal on active transponders 1 and 2, at the frequencies $F_1$ and $F_2$, respectively, followed by transmission by these transponders of infrared signals back to the pen (blocks 633 and 643). Next, as represented by the block 650, the infrared signals are received at the pen, and the time-of-flight (TOF), based on the clock time at the respective receipt of such signals, is saved as TOF1 and TOF2, and the computed TOFs are saved to RAM (block 660). Inquiry is then made (decision block 670) as to whether RAM is full. If so, a page is written to flash memory (block 680). The block 605 is then re-entered.

Figure 13:
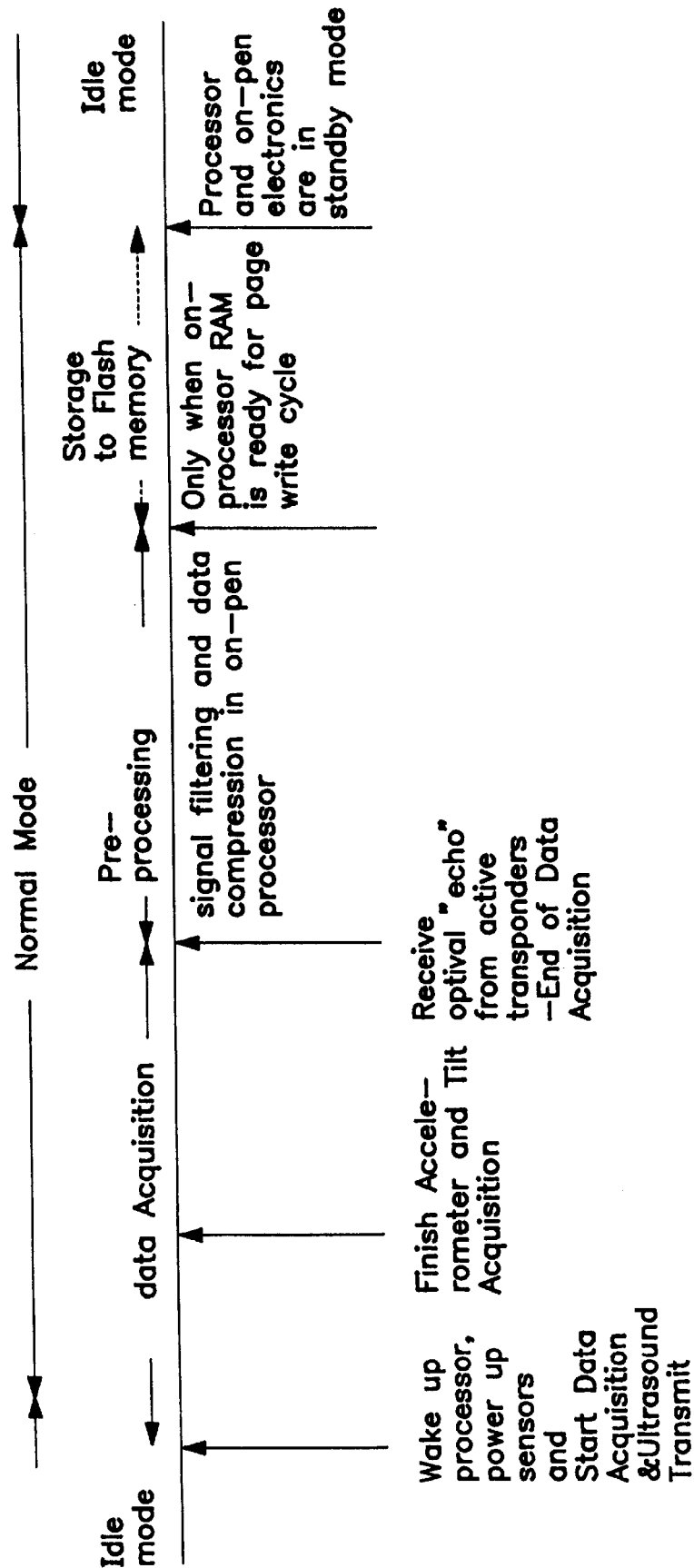
FIG. 13 is a timing diagram of operation in accordance with an embodiment of the invention.

FIG. 13 is a timing diagram for data acquisition and processing, and shows the normal mode of operation (between idle modes) as including a data acquisition stage, a pre-processing stage, and the storage to flash memory operation. The data acquisition sequence corresponds to the operations that were described in conjunction with the flow diagram of FIG. 12.

Figure 14:
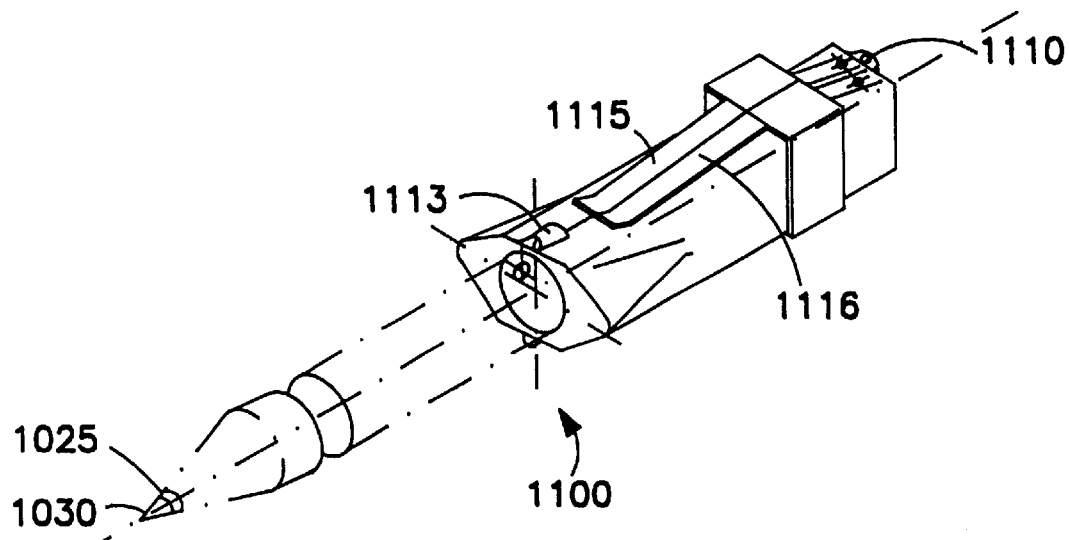
FIGS. 14 and 15 illustrate a wireless pen apparatus in accordance with a further embodiment of the invention.
Figure 15:
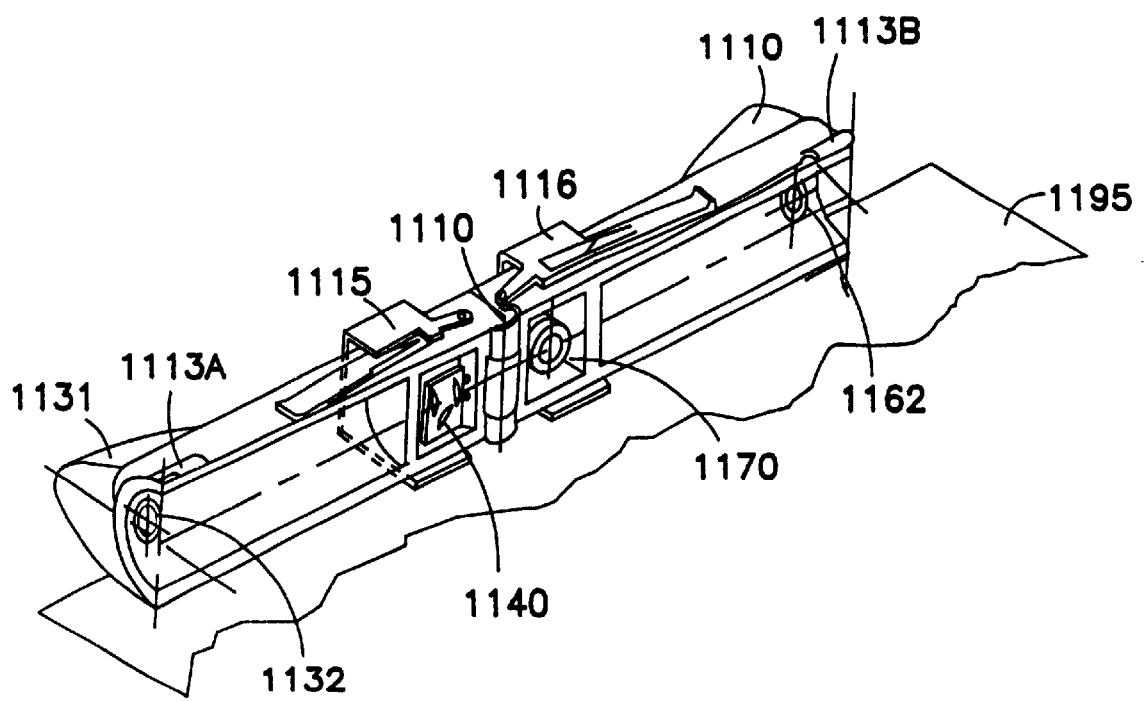

FIGS. 14 and 15 show a wireless pen apparatus in accordance with a further embodiment of the invention. The apparatus includes a wireless pen 1000 which, in FIG. 14, is shown with its cap 1100 mounted on the back thereof, which is a position of the cap that would only be used when the pen is being employed for regular writing without generation of writing-representative electronic signals. [Of course, the cap will also fit over the point of the pen for protective carrying or storage of the pen.] In the illustration of FIG. 14, the cap 1100 can be seen as having a back hinge 1110 and a two part clip 1115, 1116 which can be conventionally used as a shirt pocket clip, for example when the wireless pen apparatus is being carried by its owner. In the present embodiment, the wireless pen 1000, in one mode of operation thereof, includes an omnidirectional light source 1025 (which may comprise an array of small light sources) which are preferably, but not necessarily, as close as possible to the writing tip 1030 of the pen 1000.

FIG. 15 shows the cap 1100 when it is opened and being used as a receiving medium (and geometrical reference) for receiving signals from the pen 1000 that can be used to determine the position of a location on the pen. If the location on the pen (light source 1025) is sufficiently close to the writing tip, and depending on the desired resolution, it will be possible to obtain sufficiently resolved position-representative signals. However, it will be understood that, if necessary or desirably, the tilt and orientation of the pen can be determined by any suitable means, such as the on-board navigation means first described above. The cap 1100 comprises housing members 1130 and 1160, each of which is a tubular generally cylindrical section, which can be formed of any suitable material, such as a sturdy plastic. When the hinge 1110, which couples the members 1130 and 1160 together, is opened, as in the FIG. 15 view, a holder snap (not shown) can be used to maintain a rigid open position. [Another holder snap, illustrated at 1113A, 1113B, can retain the cap in its closed position, as in FIG. 14.] Each housing member 1130 and 1160 has a respective compartment, 1140 and 1170, at the rear end thereof. In the present embodiment, the compartment 1170 contains a battery, and the compartment 1140 includes most of the electronics in the cap, including a small microprocessor and associated circuitry. The circuitry can be of the general type shown in FIG. 11, as modified to further include control of and inputs from the optical sensing arrays, as necessary. The respective outside front ends of the housing members 1130 and 1160 include contoured protruding portions 1131 and 1161, each of which has a respective window, 1132 and 1162 into the curved inner surface of its respective housing member. In the present embodiment, the protrusions respectively house optical sensing arrays, such as CCD (charge coupled device) sensors. Insulated conductors to and from the CCD sensors can be routed through appropriate recesses (not shown) in each of the housing members. Also, any necessary contacts between the housing members can be implemented through conductive portions of the hinge 1110, through a connective cable, or through a spring connector that makes contact when the cap is in its illustrated open position.

In operation, the bottom portions of the divided clip 1115, 1116 can be used to secure the opened cap to the edge of a paper or pad of papers, represented generally at 1195 in FIG. 15. As the user writes with the wireless pen, a pressure switch in the pen (not shown), which can be, for example, mounted behind a ball point cartridge as above, senses writing pressure and can be used to activate the omnidirectional light source, and light therefrom is received by the optical sensing arrays. If necessary or desirable, a lens can be used in front of each sensor. As is known in the art, the position of a received light spot on the array can be detected to determine the arrival angle of the light, and the two arrival angles at the respective optical sensing arrays uniquely determines the position on the paper of the optical transmitting location on the pen. Another form of this embodiment can utilize, for example, ultrasonic energy for distance ranging. The pen 1000 can be provided with an ultrasound source, as previously described, and the protrusions 1131 and/or 1161 can house ultrasound sensors.

Figure 16:
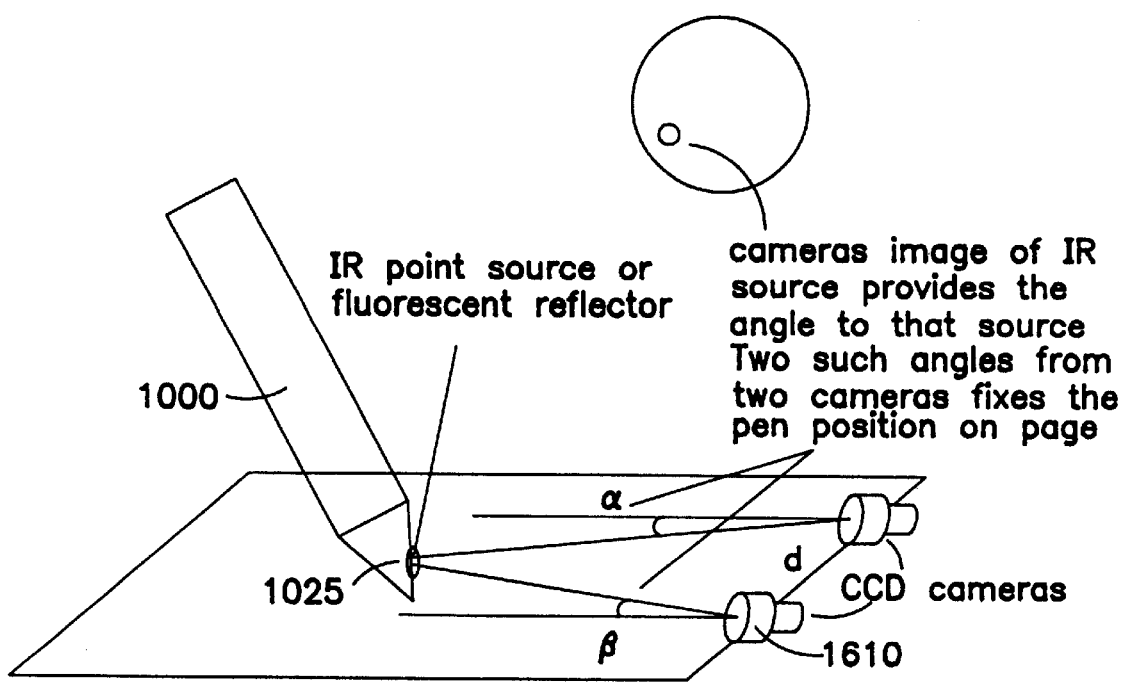
FIGS. 16, 17, and 18 are simplified diagrams illustrating operation of further embodiments of the invention.

FIG. 16 is a simplified diagram representing the pen 1000, the omnidirectional light source 1025, and spaced apart optical sensor arrays (labelled 1610, 1620) of the embodiment of FIGS. 14–15. In the diagram, d is the distance between the arrays, and α and β are, respectively, the angles of incidence on the respective camera arrays. The following is an example of an algorithm that can be used by the processor to determine the angles and the source location on the pen. The constants (default values) used are as follows:

B—distance between cameras (baseline, mm [200]
A—angle between the lens main axis and the baseline, rad [pi/3];
O—distance from the camera baseline to the edge of the paper, mm [20];
P—CCD pixel pitch, $\mu$m [20];
L—distance between the CCD chip and the lens, $\mu$m [10, 000];
T—light intensity threshold counts [100] (range: 0–255);
W—polynomial fit window, pixels [5];
M—minimum significant pen movement, mm [0.2];
C—number of columns in the images [640];
R—number of rows in the images [16];
i—camera index (0—left camera, 1—right camera looking from the pen).

The algorithm is as follows:

1) acquire images from both cameras (C×R each);
2) convert data to float type;
3) sum up the columns, resulting in two 1D arrays, Ai, C elements each (i=0,1);
4) find the maximum of each array and its corresponding index M0, M1, IM0,IM1;
5) if ALL the following conditions are met, then proceed, otherwise go to 1) Mi>T*R;

$(W-1)/2 <= IMi < C-(W-1)/2$;

6) find sub-arrays of Ai, Si starting from elements IMi−(W−1)/2, W elements each;
7) find polynomial coefficients Pni of the least squares fit to 2-nd degree polynomial for Si, using element indices IMi−(W−1)/2, . . . ,IMi+(W+1)/2 as X-coordinates (y=P0+P1x+P2x^2);
8) find subpixel values of maxima, counting from the center of each CCD; Si=C/2+P1i/(2*P2i);
9) find intermediate results $D0 = \tan(A - a\tan(P*S0/L))$, $D1 = \tan(A - a\tan(P*S1/L))$, 10) find coordinates of the pen X and Y:

$X = (D1/D0+D1))*B$;

$Y = D0*X - O$;

11) calculate distance from last point [X(k),Y(k)] to previous point [X(k−1),Y(k−1)]:

$E - \text{sqr}((X(k)-X(k-1))^2 + (Y(k)-Y(k-1))^2$;

12) if E<M, then ignore the point and go to 1), otherwise accept the point as valid new position, and to 1).

In the illustrated diagram embodiment of FIG. 16, the dot 1025 represents an optical source, preferably infrared. However, it will be understood that it can alternatively be a reflector, such as a fluorescent reflector, in which case the pen can be passive. The location of the light source (or reflector) with respect to the reference medium can be determined using the described routine. If the light source is not sufficiently near the writing tip of the pen, the pen orientation can be determined with tilt or gyro sensors on the pen using, for example, the previously described on-pen navigation system. [Alternatively, two light sources spaced apart on the pen could be used for determining pen orientation.]

Figure 17:
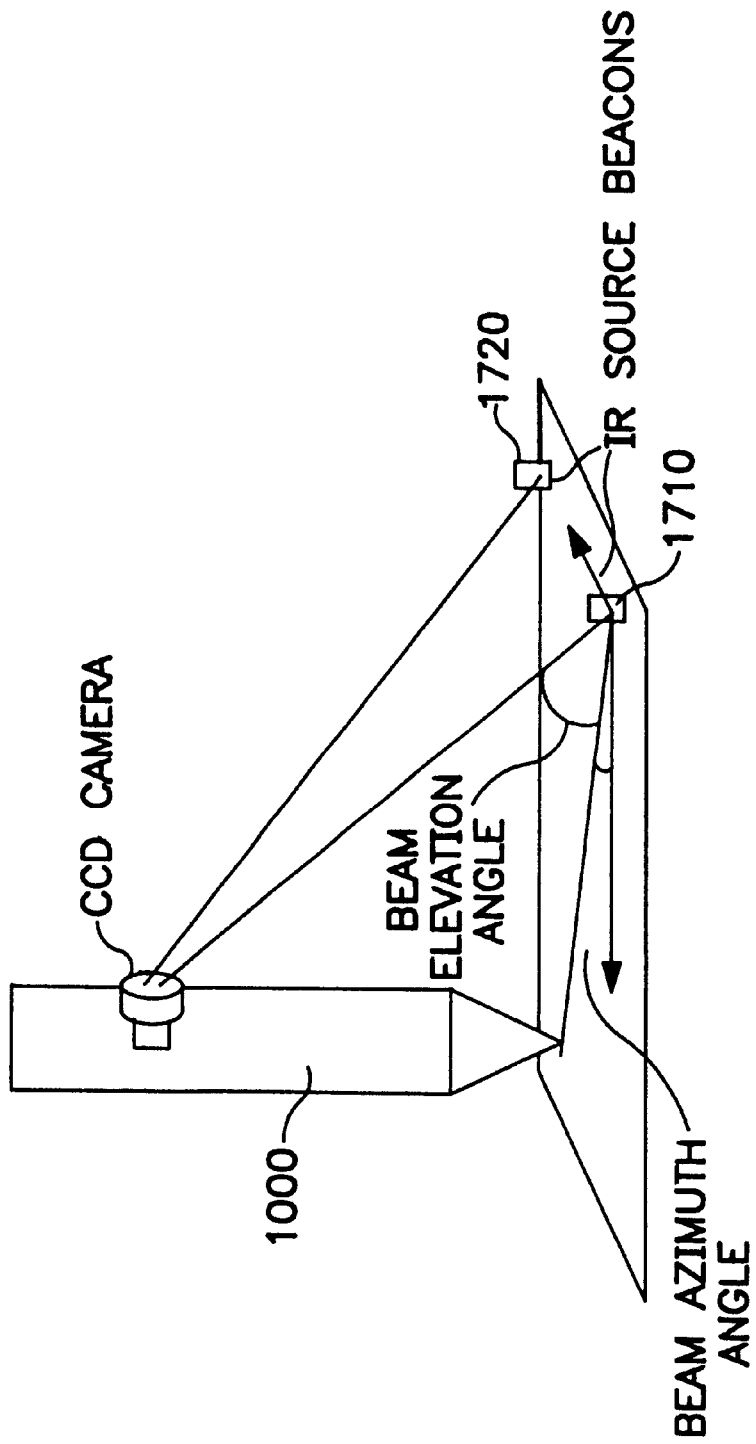

A further form of this embodiment is shown in FIG. 17. In this embodiment, the pen (1000) has a CCD microcamera and two external infrared sources (1710, 1720) that periodically send omnidirectional IR signals. The pen orientation can be determined with tilt or gyro sensors on the pen. The camera observes IR signal from one and then the other point light source. Two sources can be distinguished by different strength, frequency, or coded signal. The light source image on the CCD camera is used to determine azimuth and elevation angles between the point IR sources and the camera. Since the distance between two sources is fixed and known, and the height of the camera is known, the location of the camera can be determined. This, together with orientation of the pen, permits computation of the writing tip location. By computing and recording this periodically, the movement of the pen on the writing surface is tracked.

The accuracy of handwriting restoration depends on the number of pixels in the camera. The exact location of two IR point sources can be determined by finding the light source image on the CCD focal plane. IR light can be made the brightest point on the focal plane. Subpixel accuracy is achievable if the image is slightly unfocused and the adjacent pixels intensities are used to find the center of the beam using known centroiding methods.

Figure 18:
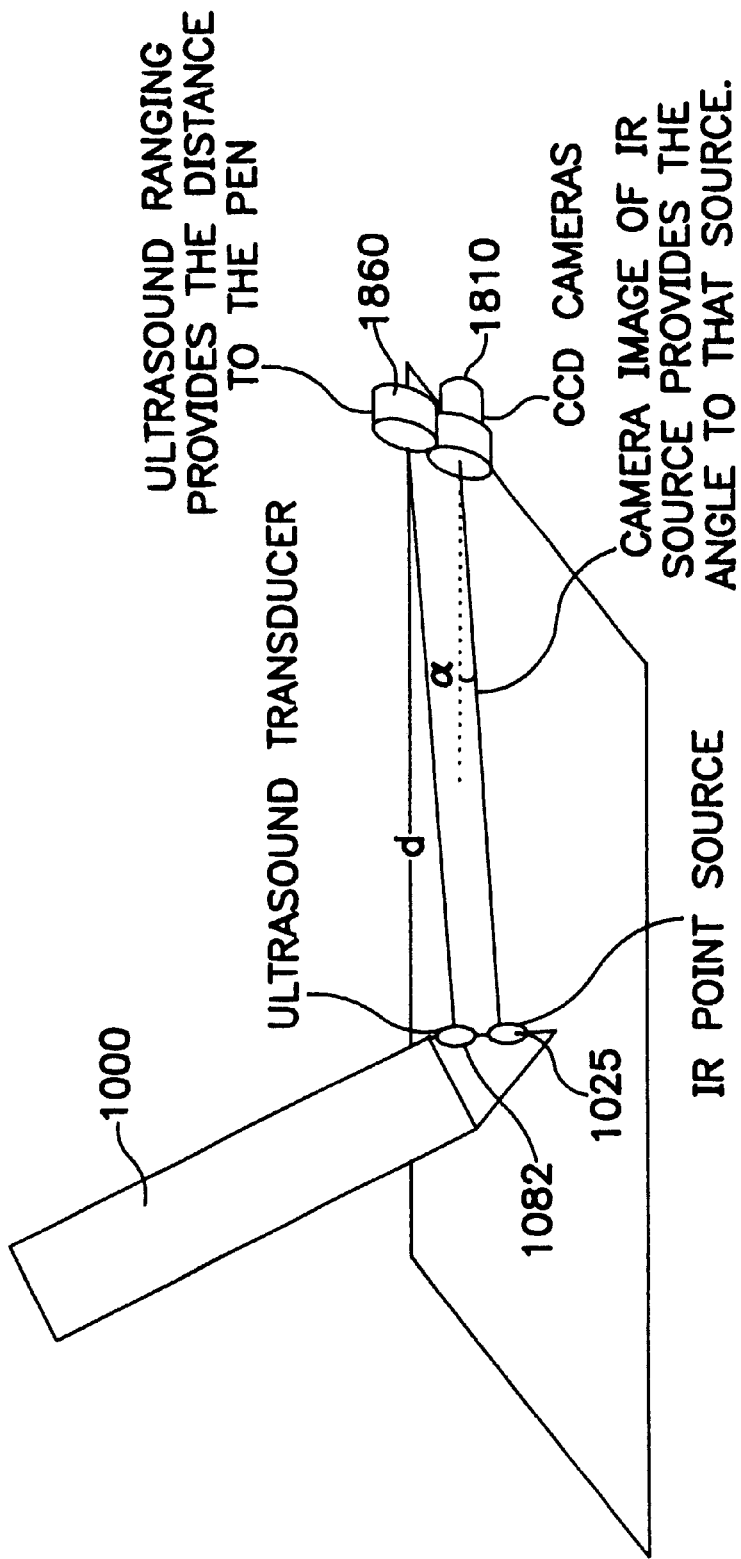

In a further form of this embodiment, the optical sensor array (e.g. CCD camera 1810) and the ultrasound transducer system (including transducer 1082 on the pen and transducer 1860 at the reference location) can be positioned in one beacon system, as shown in FIG. 18. The location of the pen is computed by measuring one distance using ultrasound distance ranging and by measuring one angle with the camera. This determines the position of the pen. An advantage of this configuration is that only one beacon location is needed. In the case of using two distance determinations or two angles, the beacons (ultrasound or light, as the case may be), separation is necessary.

Figure 19A:
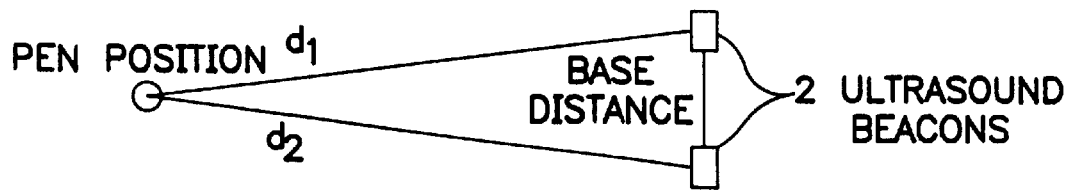
FIGS. 19A, 19B, and 19C are diagrams summarizing the types of computations that are implemented in various embodiments of the invention.
Figure 19B:
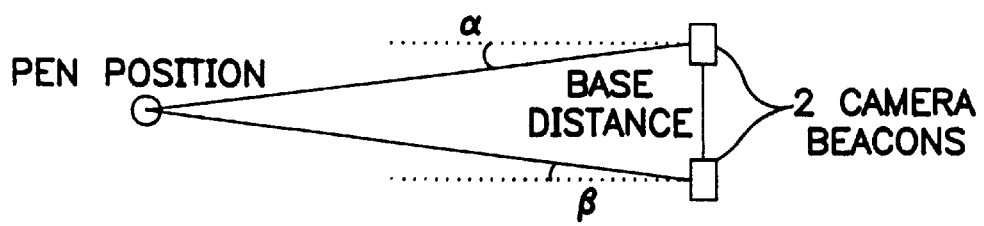
Figure 19C:
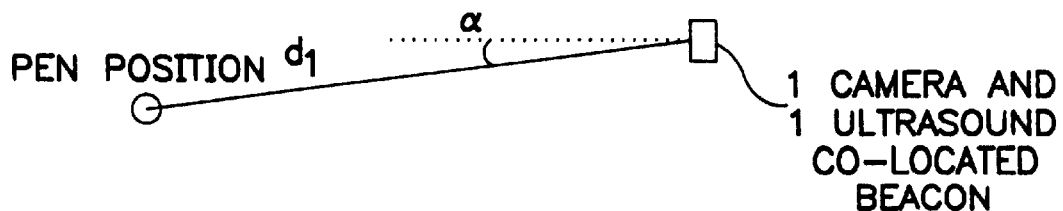

The diagrams of FIGS. 19A, 19B and 19C demonstrate determining pen location with three of the approaches, FIG. 19A illustrating distance ranging (for example using ultrasound) between two locations on the reference medium and the pen and determination of distances $d_1$ and $d_2$, FIG. 19B illustrating optical angular processing between two locations on the reference medium and the pen and determination of angles $\alpha$ and $\beta$, and FIG. 19C illustrating distance ranging and angular processing (for example using one ultrasound and one optical sensor) between a location on the reference medium and the pen and determination of distance $d_1$ and angle $\alpha$.

Figure 20:
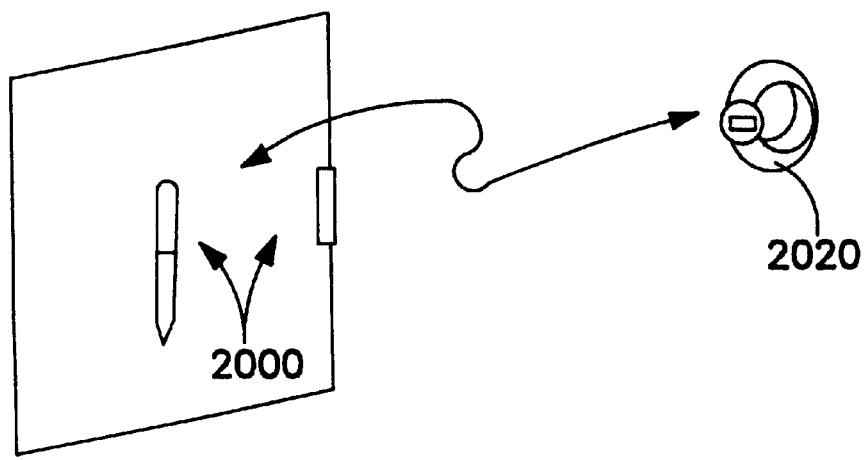
FIGS. 20 and 21 are diagrams illustrating operation in accordance with further embodiments of the invention.

In accordance with a further feature hereof, the electronic wireless pen apparatus hereof can be used in conjunction with a specially adapted wristwatch. In the diagram of FIG. 20, the wristwatch 2020 and the wireless pen apparatus (pen and/or cap) 2000 are each provided with a suitable communications subsystem, such as for infrared communication. The wristwatch, which will also preferably be equipped with a microprocessor subsystem having associated memory, timing, and input/output capabilities, could also be used, in the manner of the clip or cap previously described, to send and/or receive beacon signals, such as acoustic and/or light signals, for involvement in the pen tip position determination. The watch can be adapted to display original handwriting and drawings or convert handwriting to ASCII text. The natural pen on paper writing can be transmitted to the watch for the following functions: (1) set alarms and set time without ever programming watch's buttons; (2) schedule appointments, events, the watch reminding the user at specified time; (3) maintain "to do" list with reminders; (4) record telephone numbers and addresses; and (5) take and store notes, drawings, and sketches. Also, a watch button can be used to control pagination.

Figure 21:
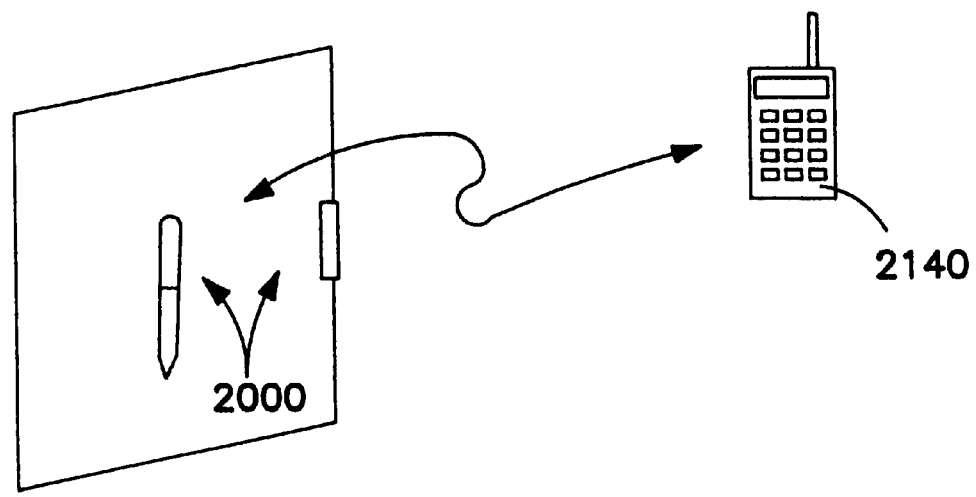

In accordance with a further feature hereof, the electronic wireless pen apparatus hereof can be used in conjunction with a specially adapted portable or cellular telephone. In the diagram of FIG. 21, the cellular phone 2140 and the wireless pen apparatus (pen and/or cap) 2000 are each provided with a suitable communications subsystem, such as for infrared communication. The cell phone, which is also preferably equipped with a microprocessor subsystem having associated memory, timing, and input/output capabilities, can also be used, in the manner of the clip or cap previously described, to send and/or receive beacon signals, such as acoustic and/or light signals, for involvement in the pen tip position determination. The cell phone can be adapted to display original handwriting and drawings and/or to convert handwriting to ASCII text. The cell phone can also fax hand drawings as well as text to any fax machine or computer. The cell phone can also be provided with zooming capability for this and other purposes. Also, the pen can be inserted for storage into a suitably provided receptacle in the cell phone.

The invention has been described with reference to particular preferred embodiments, but variations within the spirit and scope of the invention will occur to those skilled in the art. For example, it will be understood that the described features of various embodiments can be combined in any other suitable combinations to achieve the user's objectives.

What is claimed is:

1. A wireless pen apparatus for producing signals representative of writing by a user of the pen apparatus, comprising:

a wireless pen;

a removable cap on said pen; and means, operable when said cap is removed from said pen and placed at a reference position, for communicating wave energy between at least one location on the pen and at least one location on the cap for determining the position of said at least one location on the pen with respect to the reference position of the cap, and for producing signals that depend on the determined position of said at least one location on the pen.

2. Apparatus as defined by claim 1, wherein said reference position is an arbitrary position with respect to a writing surface.

3. Apparatus as defined by claim 1, wherein said reference position is a stationary position with respect to paper on which said pen is to write.

4. Apparatus as defined by claim 3, wherein said cap includes a clip for attaching said cap to an edge of said paper.

5. Apparatus as defined by claim 1, wherein said at least one location on said cap comprises first and second spaced apart locations on said cap.

6. Apparatus as defined by claim 5, wherein said cap is expandable to increase the distance between said first and second locations.

7. Apparatus as defined by claim 6, wherein said cap comprises a pair of elongated members hinged at one end, said members forming a tubular structure when said hinge is closed and forming an expanded structure when said hinge is opened.

8. Apparatus as defined by claim 7, wherein said first and second locations are at about the respective other ends of said elongated members.

9. Apparatus as defined by claim 5, wherein said at least one location on said cap comprises first and second spaced apart locations on said cap, and wherein said optical radiation is transmitted from said at least one location on the pen, and wherein said cap has first and second optical sensor arrays at said first and second locations, respectively.

10. Apparatus as defined by claim 9, wherein said cap includes means coupled with said first and second optical sensor arrays for determining the angle of arrival of optical radiation at each of said optical sensor arrays, and for generating signals representative thereof.

11. Apparatus as defined by claim 10, further comprising means in said cap for storing said signals representative of angles of arrival.

12. Apparatus as defined by claim 1, wherein said wave energy is optical radiation.

13. Apparatus as defined by claim 12, wherein said pen is mountable in a telephone.

14. Apparatus as defined by claim 1, wherein said wave energy is acoustic energy.

15. Apparatus as defined by claim 14, wherein said acoustic energy is ultrasonic energy transmitted from said at least one location on the pen, and wherein said cap has first and second ultrasonic transducers at said first and second locations, respectively.

16. Apparatus as defined by claim 15, wherein said cap includes means coupled with said first and second transducers for determining distance between said at least one location on the pen and each of said first and second locations, and for generating signals representative thereof.

17. Apparatus as defined by claim 16, further comprising means in said cap for storing said signals representative of the respective distances.

18. Apparatus as defined by claim 17, wherein said means for determining the respective distances is operative to determine elapsed time between the ultrasonic energy transmission and the arrival of said ultrasonic energy at each of said first and second locations, and wherein said elapsed time is initiated by optical radiation signalling from said pen.

19. Apparatus as defined by claim 1, wherein said wave energy comprises both optical radiation and acoustic energy, and further comprising means in said cap for determining the distance between said at least one location on the pen and said at least one location on the cap using said acoustic energy, and means in said cap for determining an angle of arrival using said optical radiation.

20. Apparatus as defined by claim 1, wherein said pen includes a pressure sensor for determining when writing is occurring, and means coupled with said pressure sensor for enabling an active operational mode of said pen apparatus.

21. Apparatus as defined by claim 1, wherein each of said pen and cap includes a respective battery.

22. Apparatus as defined by claim 1, wherein said pen is mountable in a telephone.

* * * * *